No. 877,988. PATENTED FEB. 4, 1908.
C. EDWARDS.
POWER CULTIVATOR.
APPLICATION FILED MAR. 20, 1907.
2 SHEETS—SHEET 1.
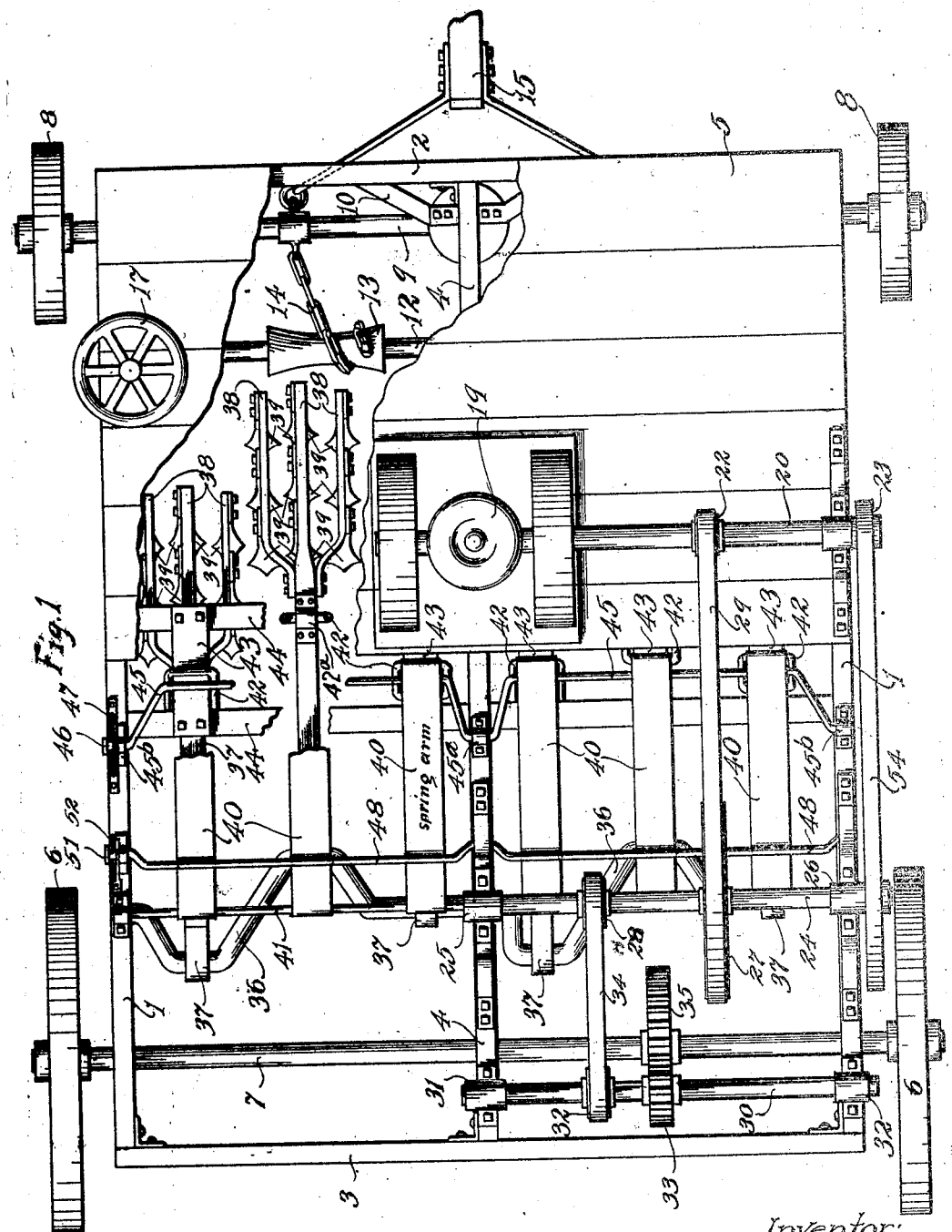
Witnesses:
L. L. Simpson.
Leon B. Losey.
Inventor:
Charles Edwards
By his Attorneys:
Williamson Merchant

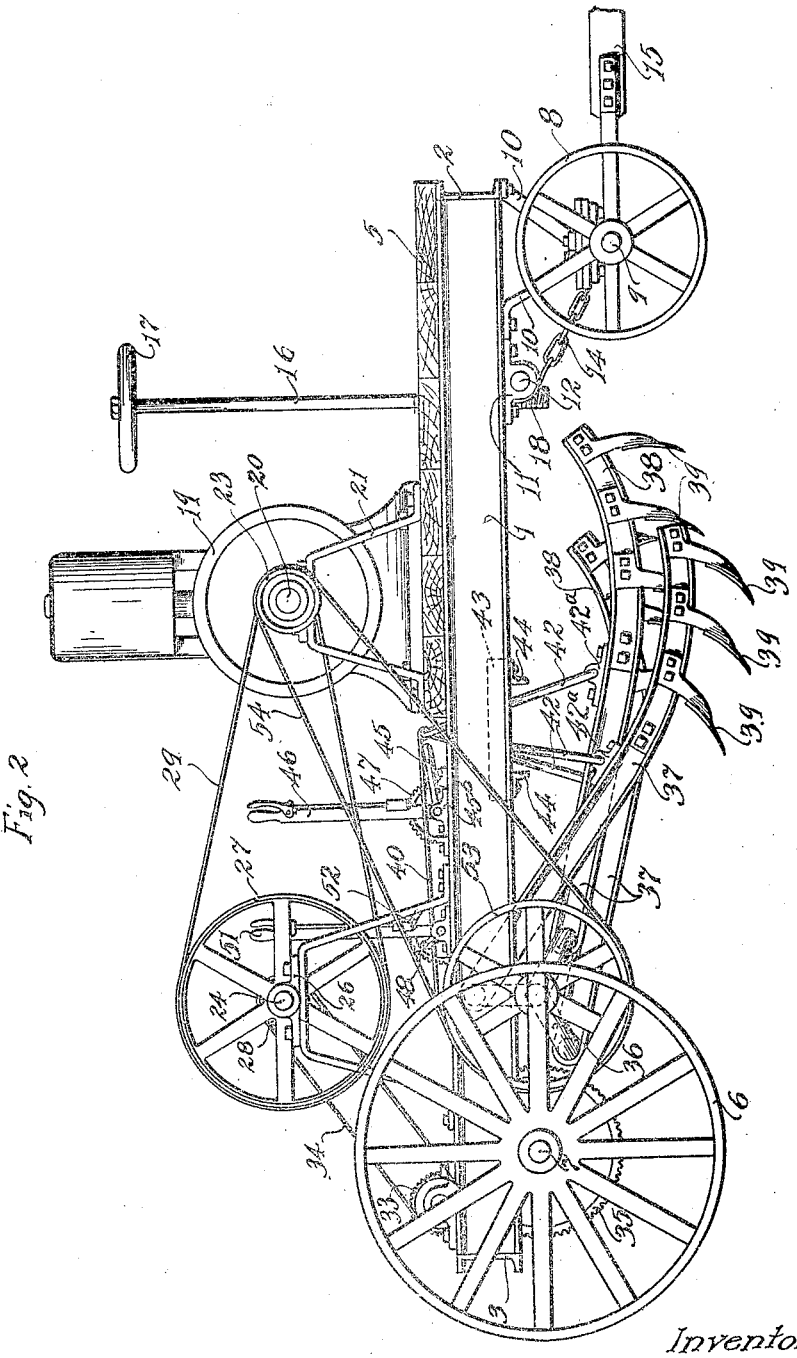

UNITED STATES PATENT OFFICE.

CHARLES EDWARDS, OF DRAYTON, NORTH DAKOTA.

POWER-CULTIVATOR.

No. 877,988.

Specification of Letters Patent.

Patented Feb. 4, 1908.

Application filed March 0, 1907. Serial No. 363,353.

*To all whom it may concern:*

Be it known that I, CHARLES EDWARDS, a citizen of the United States, residing at Drayton, in the county of Pembina and State of North Dakota, have invented certain new and useful Improvements in Power-Cultivators; and I do hereby declare the following to be a full, clear, and exact description of the invention, such as will enable others skilled in the art to which it appertains to make and use the same.

My invention has for its especial object to provide an improved power driven cultivator, and to this end it consists of the novel devices and combinations of devices hereinafter described and defined in the claims.

This improved cultivator involves a multiplicity of toothed or hoe-equipped vibratory levers that work with a tedder-like action and are adapted to be driven, under the forward movement of the machine, either by power from an engine carried from the truck of the machine, or from the traction wheels of the machine. A multiplicity of these toothed levers are arranged to work in close juxtaposition transversely of the machine and at their rear ends are given motion through a power-driven crank shaft, while the forward projections of the said levers are suspended by vibratory links. The arrangement is also such that the teeth or hoes of the said levers in their action upon the ground tend to pull the machine forward or to advance the machine in the direction of its travel. Novel means is also provided for varying the depth of cut of the teeth or hoes of the levers.

In the accompanying drawings which illustrate the machine, like characters indicate like parts throughout the several views.

Referring to the drawings, Figure 1 is a plan view of the improved machine, with some parts broken away; and Fig. 2 is a side elevation of the machine.

The truck frame is shown as rectangular in outline, being made up of laterally spaced side beams 1, front beam 2, rear beam 3 and central longitudinally extended beam 4, rigidly secured together and supporting a platform 5. The rear traction wheels 6 are secured to a rear axle 7 which is journaled in suitable bearings on the side beams 1. The front or steering wheels 8 are loosely journaled on a front axle 9 which is intermediately pivoted to a bracket 10 rigidly secured to the front portion of the truck frame. Mounted in suitable bearings 11 on the side beams 1 at the rear of the axle 9, is a windlass shaft 12 which is provided with a pair of chain sheaves 13. The chain sheaves 13 are connected by transversely wound chains 14 to the front axle 9 on opposite sides of its pivotal connection to the bracket 10.

The numeral 15 indicates a pole which is pivotally connected to the axle 9.

The numeral 16 indicates a vertical shaft which, at its upper edge, is shown as provided with a steering wheel 17 and at its lower end is connected to the windlass shaft 12 by the usual worm and gear connection 18. This steering connection, however, forms no part of my present invention and is useful only when the pole 15 is removed and the machine is driven by an engine carried by the truck and presently to be described.

The numeral 19 indicates an explosive engine shown as mounted on the platform 5 and provided with an extended shaft 20, the outer end of which is journaled in a bearing bracket 21 secured on one side of the platform 5. The shaft 20 is provided with pulleys 22 and 23.

The numeral 24 indicates a counter-shaft located at the rear of the shaft 20 and mounted in suitable bearings 25 and 26 secured, respectively, to the central beam 4 and the right hand side beam 1 of the truck frame. This counter-shaft 24 is provided with a large pulley 27 and with a smaller pulley 28. A belt 29 runs over the pulleys 22 and 27. The numeral 30 indicates another counter-shaft which is mounted in suitable bearings 31 and 32 secured, respectively, to the said central beam 4 and to the right hand beam 1 of the truck frame. This counter-shaft 30 is provided with a pulley 32 and with a spur pinion 33. A belt 34 runs over the pulleys 28 and 32. The pinion 33 meshes with a spur gear 35 secured to the rear axle 7. By the connections just described motion is transmitted from the crank shaft of the engine to the rear axle, and, hence, to the traction wheels 6 of the machine, for imparting traveling motion to the machine.

Mounted in suitable bearings located on the under sides of the central and side beams of the truck frame, is a crank shaft 36 which is provided with a multiplicity of cranks, to each of which cranks is pivotally attached the rear end of a tedder-acting lever 37. At their forwardly projecting free ends, these levers 37 are provided each with a multiplicity of arms 38 (as shown, three in number) and each of these arms 38 carries a multiplicity (as shown, three) of hoes or teeth 39 that are adapted for engagement with the ground. The forwardly extended portions of each of the levers 37 is supported by a vertically adjustable arm preferably in the form of a flat and quite strong spring 40. These spring arms 40, at their rear ends, are pivotally supported by a transverse rod 41 that is rigidly secured to suitable bearings on the side beams 1 and intermediate beam 4 of the truck frame; and at their forward ends they are pivotally attached to links 42 that are preferably formed by rods bent into approximately rectangular form and are pivotally attached at their lower ends to bearings 42ª on the intermediate portions of the respective levers 37. Each of these links 42 works straddle of and is guided by short longitudinally extended guide blocks 43 rigidly secured to small transverse angle bars 44 rigidly secured to the side bars 1 and centrally of the truck frame.

The forwardly projecting free ends of the spring arms 40 are adjustably supported by the underlying extended crank portions of a crank-like adjusting bail 45 that is pivoted to bearings 45ª and 45ᵇ, respectively, on the central bar 4 and side bars 1 of the truck frame. At one end, to-wit, as shown, at its left hand end, the adjusting bail 45 is provided with a rigidly secured latch lever 46 that coöperates with a latch segment 47 rigidly secured on the adjacent side beam 1.

Another but quite similar crank-like adjusting bail 48 is likewise pivoted to suitable bearings on the central beam 4 and side beams 1 of the truck frame. The crank portions of this bail 48 overlie and engage the upper portions of the spring arms 40 at points somewhat forward of their supporting rod 41. Also, like the crank bail 45, this crank bail 48 is provided at its left hand end with a latch lever 51 that coöperates with a latch segment 52 rigidly secured to the left hand beam 1 of the truck frame.

The crank shaft 36, at one end, to-wit, as shown at its right hand end, is provided with a pulley 53 over which end the pulley 23 on the engine shaft 20 runs a belt 54 by means of which power is transmitted from the shaft of the engine to the said crank shaft 36.

As is evident, when the machine is driven forward, either by the engine or by horses hitched to the pole 15, said crank shaft 36 will be rotated and the toothed ends of the levers 37 will be moved with a tedder-like action; that is, they will be moved upward and forward and then downward and rearward, and under their downward and rearward movement, the hoes or teeth 39 will be caused to enter and dig up the ground with which they are engaged. It is also evident that said levers are arranged in three sets for successive action and that the hoes of at least one set will always be operative on the ground under the advanced movement of the machine. This successive action is, of course, due to the arrangement of the cranks of the shaft 36 at angles to each other. In the machine described there are six levers 36 and, consequently, there are two levers in each set.

The depth of cut or penetration of the said hoes or teeth into the ground will, of course, depend upon the vertical adjustment of the forwardly projecting free ends of the spring supporting arms 40, and such adjustments of the said spring arms may, as is evident, be varied by the adjustments of the arm supporting crank bail 45. By such adjustments, the levers 37 may be so set that their teeth or hoes 39 will deeply enter the ground, in the one instance, and in the other instance will not be brought into contact with the ground. Of course, any desired adjustment between these two extremes may be accomplished by the means just stated. It is also evident that under the downward and rearward movements of the said levers 37, the pull of their teeth or hoes 39 on the ground will tend to advance the machine forward, thereby making the machine easy to run or propel. Of course, the arrangement must be such that said levers 37 and their teeth or hoes will move faster than the forward travel of the machine.

The spring supporting arms 40 permit the tooth or hoe-equipped ends of the levers 37 to rise or to cut short their downward movements in case a stone or other hard object is engaged by said teeth or hoes, and this, as is evident, will prevent breaking of the latter. The force under which the spring arms 40 will press downward on the levers 37 may be varied by adjustments of the crank bail 48. Otherwise and more particularly stated, the downward pressure of the said supporting arms is increased by the downward pressure thereon of the said crank bail 48.

By reference particularly to the plan view Fig. 1, it will be noted that the teeth or hoes of the levers 37 are so disposed that they will engage and dig up all of the ground coming within the extremes of their zone of action.

What I claim is:

1. In a machine of the kind described, the combination with a truck, of a power driven crank shaft mounted on the rear portion of the frame of said truck, a multiplicity of tedder-acting levers connected to said crank shaft at their rear ends, extended in a forwardly direction and provided at their free front ends with teeth or hoes, and links pivotally supported at their upper ends from said truck frame and pivotally connected at their lower ends to the intermediate portions of the said tedder-acting levers, substantially as described.

2. In a machine of the kind described, the combination with a truck, of a power driven crank shaft mounted on the rear portion of the frame of said truck, a multiplicity of tedder-acting levers connected to said crank shaft at their rear ends, extended in a forwardly direction and provided at their free front ends with teeth or hoes, and links pivotally and yieldingly supported at their upper ends from said truck frame and pivotally connected at their lower ends to the intermediate portions of the said tedder acting levers, substantially as described.

3. In a machine of the kind described, the combination with a crank shaft and means for rotating the same under the forward movement of the machine, of a multiplicity of tedder-acting levers connected to said crank shaft at one end and provided at their free ends with teeth or hoes, yieldingly supported arms carried by the truck frame, links connecting the free ends of said supporting arms to the intermediate portions of the respective levers, and means for vertically adjusting said supporting arms to vary the depth of cut of the teeth or hoes of said levers, substantially as described.

4. In a machine of the kind described, the combination with a crank shaft and means for rotating the same under the forward movement of the machine, of a multiplicity of tedder-acting levers connected to said crank shaft at their rear ends and provided at their forward ends with teeth or hoes, of spring supporting arms pivotally connected to the truck frame at one end, links connecting the free ends of said spring arms to the intermediate portions of said levers, means for vertically adjusting the free ends of said spring arms, and means for varying the downward pressure of said spring arms, substantially as described.

5. In a machine of the kind described, the combination with a crank shaft having cranks set at angles, of a multiplicity of tedder-acting levers pivotally connected at one end to the cranks of said shaft and provided at their free ends with teeth or hoes, yielding arms carried by the truck frame, links connecting the free ends of said arms to the intermediate portions of the respective levers, a crank bail mounted on the truck frame and underlying and supporting the free ends of said yielding arms, a latch lever attached to said adjusting bail, and a latch segment on the truck frame coöperating with said latch lever, substantially as described.

6. In a machine of the kind described, the combination with a crank shaft having cranks set at angles, of means for rotating said crank shaft under the forward movement of the machine, tedder-acting levers connected to the cranks of said shaft at their rear ends and provided at their forward ends with teeth or hoes, spring supporting arms carried by the truck frame, links connecting the free ends of said spring arms to the intermediate portions of said levers, a crank-like adjusting bail mounted on the truck frame and supporting the free ends of said spring arms, another crank-acting bail mounted on the truck frame and engageable with the said spring arms to vary the downward tension thereof, latch levers applied to said bails, and latch segments on the truck frame coöperating with the said latch levers, substantially as described.

In testimony whereof I affix my signature in presence of two witnesses.

CHARLES EDWARDS.

Witnesses:
  J. C. T. COLLEY,
  A. C. OLSON.